United States Patent
Lin et al.

(10) Patent No.: US 9,484,823 B2
(45) Date of Patent: Nov. 1, 2016

(54) POWER SUPPLY APPARATUS WITH EXTENDING HOLD UP TIME FUNCTION

(71) Applicant: Chicony Power Technology Co., Ltd., New Taipei (TW)

(72) Inventors: Bor-Ren Lin, New Taipei (TW); Hsien-Yi Tsai, New Taipei (TW)

(73) Assignee: CHICONY POWER TECHNOLOGY CO., LTD., New Taipei (TW)

( * ) Notice: Subject to any disclaimer, the term of this patent is extended or adjusted under 35 U.S.C. 154(b) by 16 days.

(21) Appl. No.: 14/642,151

(22) Filed: Mar. 9, 2015

(65) Prior Publication Data
US 2016/0268906 A1 Sep. 15, 2016

(51) Int. Cl.
*H02M 3/335* (2006.01)

(52) U.S. Cl.
CPC ............... *H02M 3/33507* (2013.01)

(58) Field of Classification Search
CPC .. H02M 1/32; H02M 3/335; H02M 3/33569; H02M 3/33507; H02M 3/28; H02M 3/315; H02M 7/48; H02M 7/515; H02H 7/122
USPC ............... 363/20, 21.01, 55, 56.01, 95, 97
See application file for complete search history.

(56) References Cited

U.S. PATENT DOCUMENTS

| | | | | |
|---|---|---|---|---|
| 4,090,234 A * | 5/1978 | Bierly | ................. | H02M 7/1552 323/258 |
| 4,147,608 A * | 4/1979 | Stevens | ................... | G05F 1/153 204/196.03 |
| 4,255,782 A * | 3/1981 | Joyce | .................... | H02M 5/293 363/159 |
| 7,227,762 B1 * | 6/2007 | Cheung | ................... | H01F 27/42 363/21.12 |
| 2002/0083947 A1 * | 7/2002 | Seakins | ............. | A61M 16/1075 128/204.17 |
| 2013/0033905 A1 * | 2/2013 | Lin | .................... | H02M 3/33507 363/21.13 |
| 2014/0160805 A1 * | 6/2014 | Oh | .................... | H02M 3/33507 363/21.02 |
| 2014/0334191 A1 * | 11/2014 | Gekinozu | ............. | H02M 3/337 363/17 |
| 2014/0362606 A1 * | 12/2014 | Gekinozu | ........... | H02M 3/3376 363/17 |
| 2015/0295502 A1 * | 10/2015 | Hirano | .................... | H02M 1/36 363/17 |

FOREIGN PATENT DOCUMENTS

| | | |
|---|---|---|
| TW | 200733521 A | 12/2005 |
| TW | M-461257 U1 | 4/2013 |

OTHER PUBLICATIONS

Office Action (Issuance Date: Jun. 7, 2016) of corresponding TW Application No. 104100373.

* cited by examiner

*Primary Examiner* — Adolf Berhane
(74) *Attorney, Agent, or Firm* — Muncy, Geissler, Olds & Lowe, P.C.

(57) ABSTRACT

A power supply apparatus with extending a hold up time function includes a transformer, a winding switching unit and a detection unit. The transformer includes a primary side winding and a secondary side winding. A turn number of the secondary side winding and a turn number of the primary side winding have a relationship of a turn ratio. When the detection unit detects that an input voltage of the primary side winding is less than an input predetermined voltage, the winding switching unit is configured to increase the turn ratio, so that an output voltage of the secondary side winding is recovered to an output predetermined voltage.

7 Claims, 3 Drawing Sheets

POWER SUPPLY APPARATUS WITH EXTENDING HOLD UP TIME FUNCTION

BACKGROUND OF THE INVENTION

1. Field of the Invention

The present invention relates to a power supply apparatus, and especially relates to a power supply apparatus with extending a hold up time function.

2. Description of the Related Art

The design of the hold up time of the related art power supply is based on the capacitor energy-storage formula: $(1/2)C(V2^2-V1^2)=PT$, wherein the C means the bulk capacitor, the V2 means the operating voltage, the V1 means the cut-off voltage, the P means the output power of the power supply, and the T means the hold up time. According to the formula mentioned above, in order to extend the hold up time effectively, the research personnel will increase the bulk capacitor. However, the design of the modern power supply is slimmer and lighter today. The bulk capacitor has a larger volume, so that increasing the bulk capacitor is not practical for the modern power supply. This problem needs to be resolved.

SUMMARY OF THE INVENTION

In order to solve the above-mentioned problems, an object of the present invention is to provide a power supply apparatus with extending a hold up time function.

In order to achieve the object of the present invention mentioned above, the power supply apparatus comprises a transformer, a winding switching unit and a detection unit. The winding switching unit is electrically connected to the transformer. The detection unit is electrically connected to the winding switching unit. The transformer comprises a primary side winding and a secondary side winding. The secondary side winding is coupled and induced to the primary side winding. A turn number of the secondary side winding and a turn number of the primary side winding have a relationship of a turn ratio. When the detection unit detects that an input voltage of the primary side winding is less than an input predetermined voltage, the winding switching unit is configured to increase the turn ratio, so that an output voltage of the secondary side winding is recovered to an output predetermined voltage.

Moreover, the power supply apparatus further comprises a rectifier electrically connected to the transformer. The detection unit detects a first connection point connected to an alternating current power side and the rectifier, or detects a second connection point connected to the rectifier and the primary side winding, or detects an output side of the power supply apparatus.

Moreover, the winding switching unit comprises a primary side winding switch electrically connected to the primary side winding and the detection unit. The transformer is a central-tapped transformer.

Moreover, the detection unit comprises a comparator electrically connected to the winding switching unit.

Moreover, the winding switching unit is configured to increase the turn ratio when the detection unit does not receive any signal over a predetermined time.

Moreover, the secondary side winding comprises a first secondary side winding and a second secondary side winding. The first secondary side winding is electrically connected to the winding switching unit. The second secondary side winding is electrically connected to the winding switching unit and the first secondary side winding. The winding switching unit comprises a secondary side winding switch electrically connected to the first secondary side winding, the second secondary side winding and the detection unit.

Moreover, the power supply apparatus further comprises a rectifier electrically connected to the transformer. The detection unit comprises a comparator electrically connected to the winding switching unit.

The advantage of the present invention is to change the turn ratio to have the same hold up time when using a small bulk capacitor to reduce the volume of the power supply.

DETAILED DESCRIPTION OF THE INVENTION

Please refer to following detailed description and figures for the technical content of the present invention. The following detailed description and figures are referred for the present invention, but the present invention is not limited to it.

Figure 1:
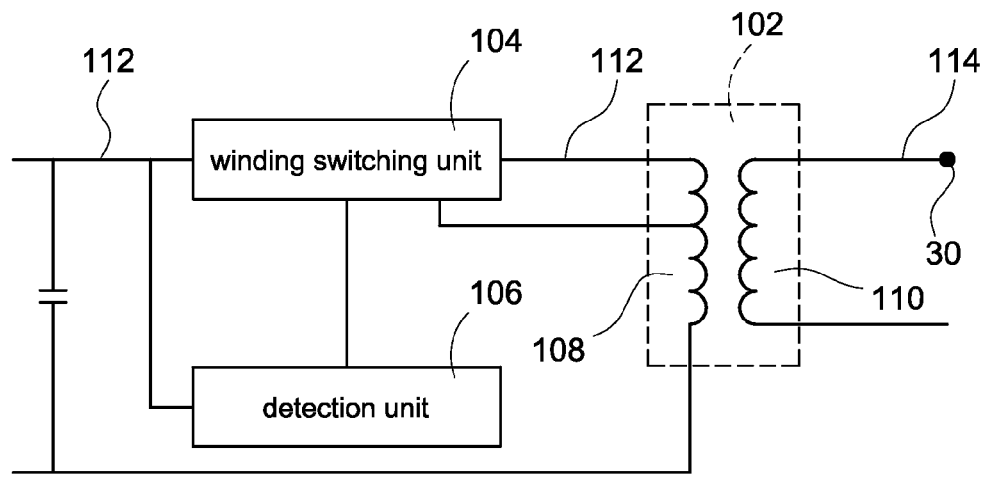
FIG. 1 shows a block diagram of the first embodiment of the power supply apparatus of the present invention.

FIG. 1 shows a block diagram of the first embodiment of the power supply apparatus of the present invention. A power supply apparatus 10 with extending a hold up time function comprises a transformer 102, a winding switching unit 104 and a detection unit 106. The winding switching unit 104 is electrically connected to the transformer 102. The detection unit 106 is electrically connected to the winding switching unit 104.

The transformer 102 comprises a primary side winding 108 and a secondary side winding 110. The primary side winding 108 is coupled and induced to the winding switching unit 104. The secondary side winding 110 is coupled and induced to the primary side winding 108.

A turn number of the secondary side winding 110 and a turn number of the primary side winding 108 have a relationship of a turn ratio. When the detection unit 106 detects that an input voltage 112 of the primary side winding 108 is less than an input predetermined voltage, the winding switching unit 104 is configured to increase the turn ratio, so that an output voltage 114 of the secondary side winding 110 is recovered to an output predetermined voltage.

The turn ratio multiplied by the input voltage 112 is equal to the output voltage 114. Therefore, when the input voltage 112 is decreased, the turn ratio can be changed to maintain (namely, keep or hold) the output voltage 114 to be the output predetermined voltage for a predetermined time, so that the electronic system can finish necessary storages and controls to shut down safely.

More specifically, according to the formula: $Vo=(Ns/Np)*Vin*D$, when the D is the maximum, the turn ratio (namely, the Ns/Np) can be adjusted to maintain (namely, keep or hold) the output voltage 114 (namely, the Vo). The Vo means the output voltage 114. The Ns means the turn number of the secondary side winding 110. The Np means the turn number of the primary side winding 108. The Vin means the input voltage 112. The D means a duty cycle of a primary side transistor switch (not shown in FIG. 1).

Figure 4:
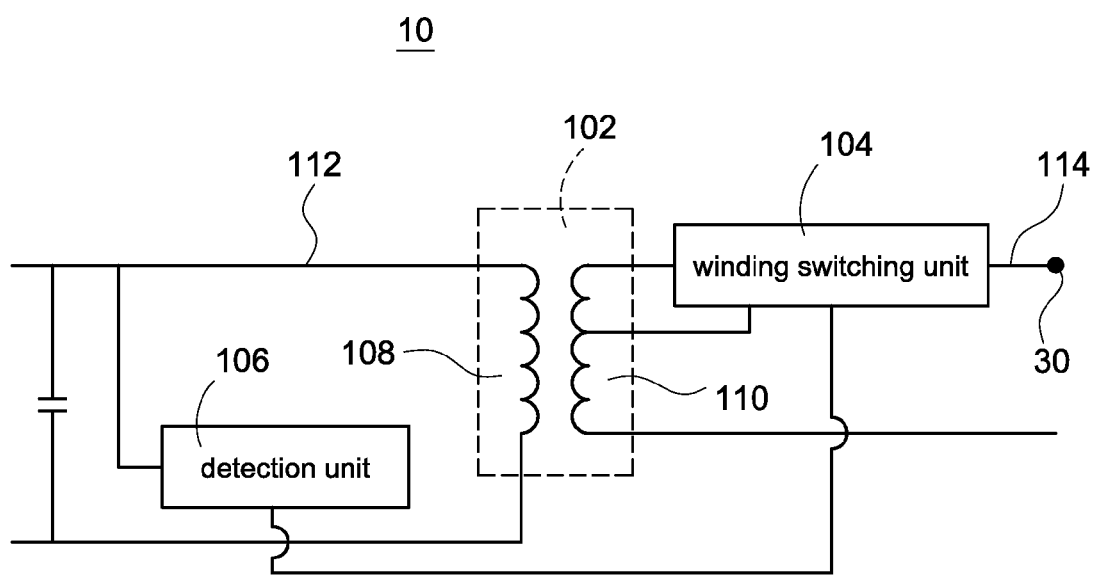
FIG. 4 shows a block diagram of the fourth embodiment of the power supply apparatus of the present invention.

FIG. 4 shows a block diagram of the fourth embodiment of the power supply apparatus of the present invention. The description for the elements shown in FIG. 4, which are similar to those shown in FIG. 1, is not repeated here for brevity.

Figure 2:
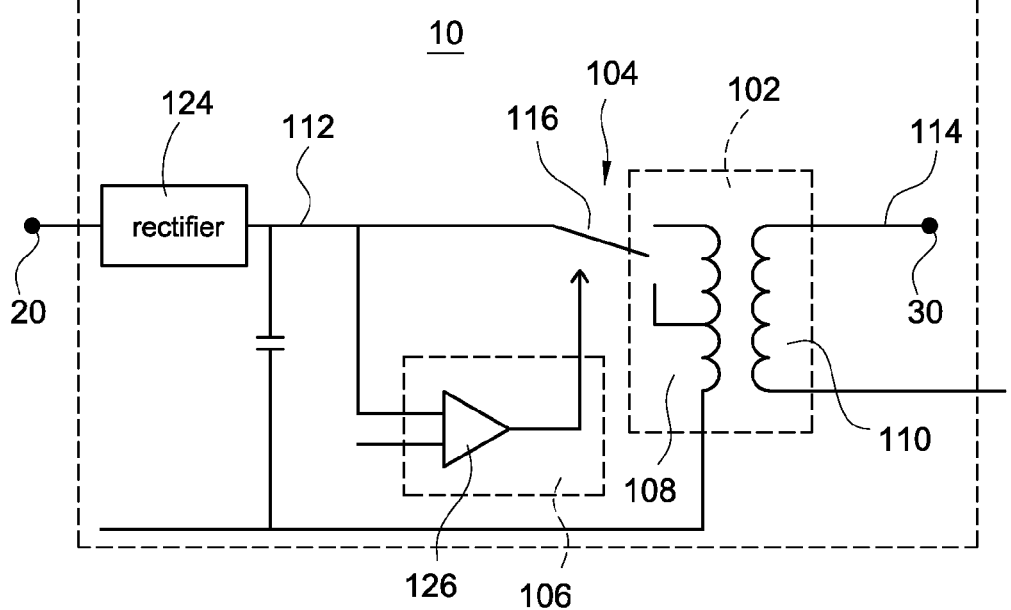
FIG. 2 shows a block diagram of the second embodiment of the power supply apparatus of the present invention.

FIG. 2 shows a block diagram of the second embodiment of the power supply apparatus of the present invention. The description for the elements shown in FIG. 2, which are similar to those shown in FIG. 1, is not repeated here for brevity. Moreover, the winding switching unit 104 comprises a primary side winding switch 116 electrically connected to the primary side winding 108 and the detection unit 106. The transformer 102 is a central-tapped transformer.

Moreover, the power supply apparatus 10 further comprises a rectifier 124 electrically connected to the transformer 102. The detection unit 106 comprises a comparator 126 electrically connected to the winding switching unit 104.

The detection unit 106 detects a first connection point connected to an alternating current power side 20 and the rectifier 124, or detects a second connection point connected to the rectifier 124 and the primary side winding 108, or detects an output side 30 of the power supply apparatus 10.

In another embodiment, the winding switching unit 104 is configured to increase the turn ratio when the detection unit 106 does not receive any signal over a predetermined time (for example, 10 milliseconds).

When the input voltage 112 is not less than the input predetermined voltage, the comparator 126 controls the primary side winding switch 116 to connect to a connection point on the primary side winding 108, so that the turn number of the primary side winding 108 is the maximum.

When the input voltage 112 is less than the input predetermined voltage, the comparator 126 controls the primary side winding switch 116 to connect to a middle connection point on the primary side winding 108, so that the turn number of the primary side winding 108 is about half of the maximum, and then the turn ratio is increased, and the output voltage 114 is recovered to the output predetermined voltage.

Figure 3:
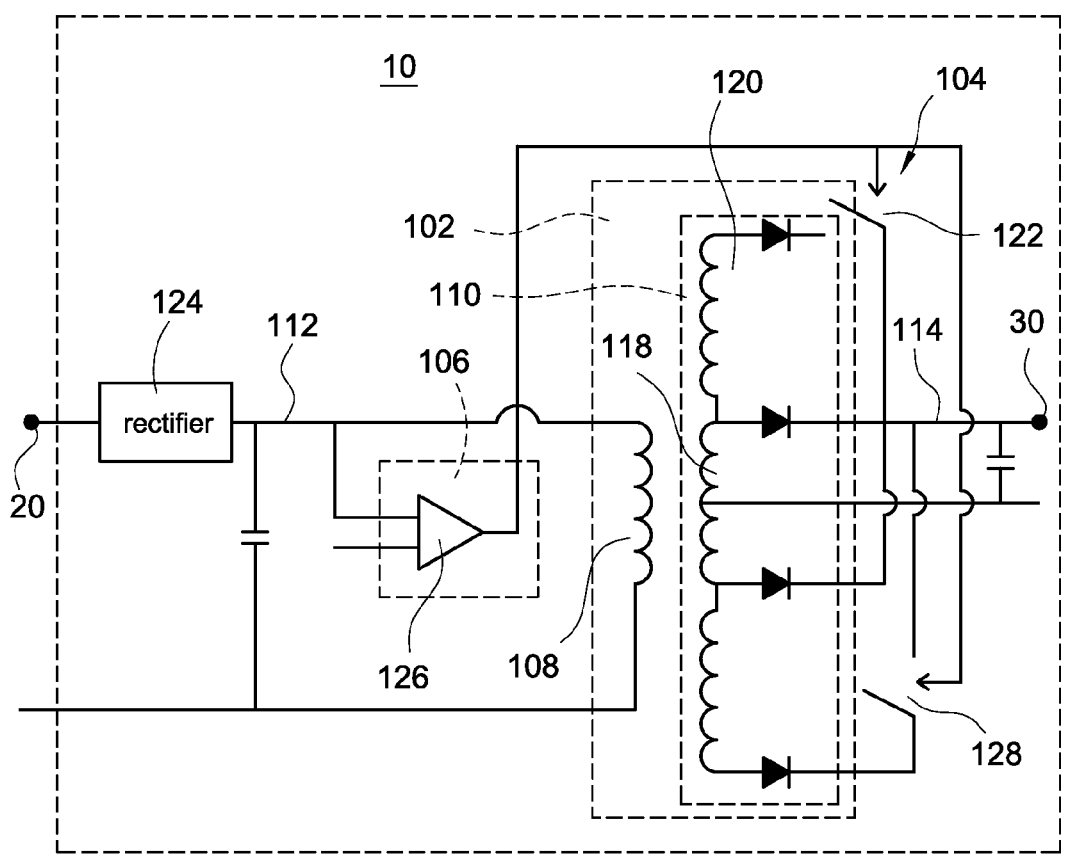
FIG. 3 shows a block diagram of the third embodiment of the power supply apparatus of the present invention.

FIG. 3 shows a block diagram of the third embodiment of the power supply apparatus of the present invention. The description for the elements shown in FIG. 3, which are similar to those shown in FIG. 1 and FIG. 2, is not repeated here for brevity. Moreover, the secondary side winding 110 comprises a first secondary side winding 118 and a second secondary side winding 120. The first secondary side winding 118 is electrically connected to the winding switching unit 104. The second secondary side winding 120 is electrically connected to the winding switching unit 104 and the first secondary side winding 118.

The winding switching unit 104 comprises a secondary side winding switch 122 and a secondary side winding second switch 128. The secondary side winding switch 122 is electrically connected to the first secondary side winding 118, the second secondary side winding 120 and the detection unit 106. The secondary side winding second switch 128 is electrically connected to the first secondary side winding 118, the second secondary side winding 120 and the detection unit 106.

When the input voltage 112 is less than the input predetermined voltage, the comparator 126 turns on the secondary side winding switch 122 and the secondary side winding second switch 128, so that the turn number of the secondary side winding 110 is the maximum, so that the turn ratio is increased, and the output voltage 114 is recovered to the output predetermined voltage.

When the input voltage 112 is not less than the input predetermined voltage, the comparator 126 turns off the secondary side winding switch 122 and the secondary side winding second switch 128, so that the turn number of the secondary side winding 110 is decreased to be less than the maximum.

The advantage of the present invention is to change the turn ratio to have the same hold up time when using a small bulk capacitor to reduce the volume of the power supply.

Although the present invention has been described with reference to the preferred embodiment thereof, it will be understood that the invention is not limited to the details thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. A power supply apparatus with extending a hold up time function, the power supply apparatus comprising:
   a transformer;
   a winding switching unit electrically connected to the transformer; and
   a detection unit electrically connected to the winding switching unit,
   wherein the transformer comprises:
   a primary side winding; and
   a secondary side winding coupled and induced to the primary side winding,
   wherein a turn number of the secondary side winding and a turn number of the primary side winding have a relationship of a turn ratio; when the detection unit detects that an input voltage of the primary side winding is less than an input predetermined voltage, the winding switching unit is configured to increase the turn ratio, so that an output voltage of the secondary side winding is recovered to an output predetermined voltage.

2. The power supply apparatus in claim 1, further comprising a rectifier electrically connected to the transformer, wherein the detection unit detects a first connection point connected to an alternating current power side and the rectifier, or detects a second connection point connected to the rectifier and the primary side winding.

3. The power supply apparatus in claim 2, wherein the winding switching unit comprises a primary side winding switch electrically connected to the primary side winding and the detection unit; the transformer is a central-tapped transformer.

4. The power supply apparatus in claim 3, wherein the detection unit comprises a comparator electrically connected to the winding switching unit.

5. The power supply apparatus in claim 3, wherein the winding switching unit is configured to increase the turn ratio when the detection unit does not receive any signal over a predetermined time.

6. The power supply apparatus in claim 1, wherein the secondary side winding comprises:
   a first secondary side winding electrically connected to the winding switching unit; and
   a second secondary side winding electrically connected to the winding switching unit and the first secondary side winding, wherein the winding switching unit comprises a secondary side winding switch electrically connected to the first secondary side winding, the second secondary side winding and the detection unit.

7. The power supply apparatus in claim 6, further comprising a rectifier electrically connected to the transformer, wherein the detection unit comprises a comparator electrically connected to the winding switching unit.

* * * * *